(12) United States Patent
Ishikawa et al.

(10) Patent No.: US 6,190,767 B1
(45) Date of Patent: Feb. 20, 2001

(54) AQUEOUS EMULSION FOR PRESSURE-SENSITIVE ADHESIVE AND PROCESS FOR THE PREPARATION THEREOF

(75) Inventors: Yoshinobu Ishikawa; Hiroaki Kitayama; Masaki Nomura, all of Wakayama (JP)

(73) Assignee: Toyo Ink Manufacturing Co., Ltd., Tokyo (JP)

( * ) Notice: Under 35 U.S.C. 154(b), the term of this patent shall be extended for 0 days.

(21) Appl. No.: 09/011,504

(22) PCT Filed: Dec. 6, 1995

(86) PCT No.: PCT/JP95/02492

§ 371 Date: Feb. 9, 1998

§ 102(e) Date: Feb. 9, 1998

(87) PCT Pub. No.: WO97/07174

PCT Pub. Date: Feb. 27, 1997

(30) Foreign Application Priority Data

Aug. 14, 1995 (JP) .................................................... 7-206997

(51) Int. Cl.⁷ ............................. C09J 7/02; C09J 125/02; C09J 131/02; C09J 133/02; C09J 133/06

(52) U.S. Cl. ................................... 428/355 AC; 524/824; 524/832; 524/845; 526/328; 526/329.2; 526/329.7

(58) Field of Search ...................... 428/355 AC; 524/824, 524/832, 845; 526/328, 329.2, 329.7

(56) References Cited

FOREIGN PATENT DOCUMENTS

| | | |
|---|---|---|
| 6386777 | 4/1988 | (JP) . |
| 4320475 | 11/1992 | (JP) . |
| 551570 | 3/1993 | (JP) . |
| 6192307 | 7/1994 | (JP) . |
| 6192341 | 7/1994 | (JP) . |
| 782537 | 3/1995 | (JP) . |

OTHER PUBLICATIONS

Full English Language Translation of JP 05–51570, Mar. 1993.*
Full English Language Translation of JP 06–192307, Jul. 1994.*
Full English Lanugage Translation of JP 06–192341, Jul. 1994.*
Full English Language Translation of JP 07–82537, Mar. 1995.*
Derwent–Acc–No: 1993–112923, English Language Abstract of JP 5–51570, Mar. 1993.*
Derwent–Acc–No: 1988–144438, English Language Abstracts of JP 63–86777, Apr. 1988.*
Derwent–Acc–No: 1994–260545, English Language Abstract of JP 6–192341, Jul. 1994.*
Derwent–Acc–No: 1995–159196, English Language Abstract of JP 7–82537, Mar. 1995.*
Derwent–Acc–No: 1994–260522, English Language Abstract of JP 6–192307, Jul. 1994.*
J. Polymer Sci., vol. 5, No. 2, issued 1950 (no month), Harkins, "General Theory of Mechanism of Emulsion Polymerization. II*", pp. 217–251.

* cited by examiner

Primary Examiner—Blaine Copenheaver
(74) Attorney, Agent, or Firm—Birch, Stewart, Kolasch & Birch, LLP

(57) ABSTRACT

A pressure-sensitive adhesive prepared by emulsifying dispersing a monomer mixture containing at least 50% by weight, based on the total weight of the monomer mixture, of a long-chain alkyl (meth)acrylate with the alkyl having 9 to 13 carbon atoms in an aqueous surfactant solution to bring the monomer mixture to fine particles having an average diameter of not more than 2.0 μm and polymerizing the monomer mixture in the presence of a water-soluble polymerization initiator can provide a pressure-sensitive adhesive which possesses excellent moisture resistance, water resistance, weather resistance, and adhesion to a nonpolar adherend, such as a polyolefin plastic, and, at the same time, well-balanced tackiness properties.

24 Claims, No Drawings

AQUEOUS EMULSION FOR PRESSURE-SENSITIVE ADHESIVE AND PROCESS FOR THE PREPARATION THEREOF

BACKGROUND OF THE INVENTION

1. Field of the Invention

The present invention relates to an aqueous emulsion for a pressure-sensitive adhesive and a process for preparing the same, and a pressure-sensitive adhesive prepared using the aqueous emulsion for a pressure-sensitive adhesive.

2. Description of Related Art

In recent years, in the field of pressure-sensitive adhesives, the conversion of solvent type pressure-sensitive adhesive compositions to aqueous emulsion type pressure-sensitive adhesive compositions has been desired from the viewpoint of the global environment, working environment, and effective utilization of resources. An emulsion type pressure-sensitive adhesive composition comprising a polymer containing a (meth)acrylic ester, with the alkyl having not more than 8 carbon atoms, as the main constituent monomer (hereinafter referred to as "acrylate emulsion type pressure-sensitive adhesive composition 1") is known as one of such aqueous emulsion type pressure-sensitive adhesive compositions. This pressure-sensitive adhesive composition 1 is mainly prepared by emulsion polymerization and is extensively utilized in applications, such as labels. A coating formed of the acrylate emulsion type pressure-sensitive adhesive composition 1, however, is inferior in moisture resistance and water resistance to the solvent type pressure-sensitive adhesive composition. Therefore, the solvent type pressure-sensitive adhesive composition is generally used in applications where high performance is required, so that at the present time the conversion of the solvent type pressure-sensitive adhesive composition to the emulsion type pressure-sensitive adhesive composition is unsatisfactory.

The use of a radical-polymerizable emulsifying and dispersing agent in the emulsion polymerization in order to improve the water resistance of a coating formed from the polymer emulsion is known in the art. Specifically, the application of a product prepared by the emulsion polymerization of an acrylic ester using a radical-polymerizable emulsifier to a pressure-sensitive adhesive has been proposed in the art. The coating formed from the polymer emulsion has better water resistance than a coating formed from the conventional polymer emulsion. The water resistance, however, is not necessarily satisfactory.

The mechanism of the emulsion polymerization has been qualitatively elucidated by Harkins (see J. Polymer Sci., 5, 217 (1950)), and a quantitative theory on the mechanism has been developed by Smith and Ewart. According to Harkins, in the emulsion polymerization, the emulsifier first forms a micelle, and the monomer is solubilized in the micelle, followed by the attack of the monomer by a radical generated in an aqueous system to initiate polymerization. Subsequently, the monomer is gradually diffused from monomer oil droplets present in the aqueous system and fed into the micelle to permit the polymerization to proceed. Thus, micelle particles are grown into polymer particles.

When the water solubility of the monomer is excessively low, however, the monomer cannot be successfully fed from the monomer oil droplets into the micelle, inhibiting smooth progression of the polymerization reaction. This is the major reason why a polymer emulsion cannot be prepared from a sparingly water-soluble monomer by the emulsion polymerization. The (meth)acrylic ester is a sparingly water-soluble monomer. Therefore, when the (meth)acrylic ester is used as the monomer, no stable polymer emulsion can be prepared for the above reason.

In recent years, the number of kinds and quantity of plastic products used as industrial materials and consumer materials have been increased, and this tendency is particularly significant for the quantity of polyolefin plastics. Therefore, there is an ever-increasing demand for a pressure-sensitive adhesive having good tackiness properties against the polyolefin plastics.

The pressure-sensitive adhesive prepared from the acrylate emulsion type pressure-sensitive adhesive composition 1 is free from odor and possesses excellent weather resistance and heat resistance. It, however, is unsatisfactory in the adhesion to nonpolar adherends, such as polyolefin plastics. An attempt to add an aqueous emulsification product of a tackifier to the pressure-sensitive adhesive composition 1 has been made to reduce this drawback. This, however, results in remarkably lowered water resistance of the resultant pressure-sensitive adhesive due to the influence of an emulsifying and dispersing agent contained in the tackifier emulsification product. Further, the polymer constituting the acrylate emulsion type pressure-sensitive adhesive composition 1 has an unsatisfactory cohesive force and hence a pressure-sensitive adhesive prepared from the composition cannot satisfactorily retain the adhesive strength.

Further, JP-A 6-192307 (published on Jul. 12, 1994) discloses a process for preparing an emulsion type pressure-sensitive adhesive composition comprising a polymer containing a (meth) acrylic ester, with the alkyl having 9 to 30 carbon atoms, as one of the monomers constituting the polymer (hereinafter referred to as "acrylate emulsion type pressure-sensitive adhesive composition 2"), and JP-A 6-192341 (published on Jul. 12, 1994) discloses a process for preparing an emulsion type pressure-sensitive adhesive composition comprising a polymer containing a (meth) acrylic ester, with the alkyl having 10 to 34 carbon atoms, as the major constituent monomer (hereinafter referred to as "acrylate emulsion type pressure-sensitive adhesive composition 3"). These methods are characterized by the size of monomer droplets in the emulsion during the polymerization. Further, the invention disclosed in JP-A 6-192307 is characterized by using a particular dispersion stabilizer and a radical polymerization initiator, and the invention disclosed in JP-A 6-192341 is characterized by the proportion of the (meth)acrylic ester in the monomer mixture. Neither JP-A 6-192307 nor JP-A 6-192341, however, refers to the weather resistance of a pressure-sensitive adhesive prepared from the composition 2 or 3 and the adhesion of the pressure-sensitive adhesive to nonpolar adherends, such as polyolefin plastics.

Accordingly, an object of the present invention is to provide an aqueous emulsion for a pressure-sensitive adhesive which can solve the above problems involved in the conventional emulsion type pressure-sensitive adhesive compositions and can be used to prepare a pressure-sensitive adhesive possessing excellent moisture resistance, water resistance, weather resistance, and adhesion to nonpolar adherends, such as polyolefin plastics, and at the same time well-balanced tackiness properties.

DISCLOSURE OF THE INVENTION

Summary of the Invention

The present inventors have made intensive studies with a view to overcoming the above problems. As a result, they have found that emulsification and dispersion of a monomer mixture having a particular composition in an aqueous system in the presence of an emulsifying and dispersing agent, preferably a radical-polymerizable emulsifying and dispersing agent, to bring the monomer mixture to fine particles followed by polymerization using the fine particles of the monomer mixture as a polymerization field can stably produce a highly stable aqueous emulsion for a pressure-sensitive adhesive which can provide a pressure-sensitive adhesive possessing excellent moisture resistance, water resistance, weather resistance, and adhesion to nonpolar adherends, such as polyolefin plastics, and, in addition, well-balanced tackiness properties. The above finding has led to the completion of the present invention.

Thus, according to the first aspect of the present invention, there is provided an aqueous emulsion for a pressure-sensitive adhesive comprising a polymer prepared by polymerizing a monomer mixture containing at least 50% by weight, based on the total weight of the monomer mixture, of a long-chain alkyl (meth)acrylate with the alkyl having 9 to 13 carbon atoms. In the present invention, the term "monomer mixture" refers to not only the case where two or more monomers are used but also the case where a single monomer is used.

The polymer usually has a weight-average molecular weight of 100,000 to 3,000,000.

The first aspect of the present invention embraces an embodiment where the content of the long-chain alkyl (meth)acrylate is 50 to less than 75% by weight based on the total weight of the monomer mixture and an embodiment where the content of the long-chain alkyl (meth)acrylate is more than 99.45 to 100% by weight based on the total weight of the monomer mixture.

The long-chain alkyl (meth)acrylate is preferably lauryl (meth)acrylate.

According to the first aspect of the present invention, the monomer mixture preferably comprises, based on the total weight of the monomer mixture, 75 to 99.45% by weight of the long-chain alkyl (meth)acrylate with the alkyl having 9 to 13 carbon atoms, 0.5 to 20% by weight of an aromatic vinyl monomer, and 0.05 to 5% by weight of a crosslinkable monomer. The aromatic vinyl monomer is preferably styrene, and the crosslinkable monomer is preferably a monomer having two or more double bonds per molecule.

According to the second aspect of the present invention, there is provided a process for preparing an aqueous emulsion for a pressure-sensitive adhesive, comprising emulsifying and dispersing a monomer mixture containing at least 50% by weight, based on the total weight of the monomer mixture, of a long-chain alkyl (meth)acrylate with the alkyl having 9 to 13 carbon atoms in an aqueous surfactant solution to bring the monomer mixture to fine particles having an average diameter of not more than 2.0 μm and polymerizing the monomer mixture in the presence of a water-soluble polymerization initiator.

The surfactant is preferably a radical-polymerizable emulsifying and dispersing agent. The radical-polymerizable emulsifying and dispersing agent to be used is still preferably anionic or nonionic, particularly preferably anionic.

The water-soluble polymerization initiator is preferably a redox polymerization initiator.

Preferably, the fine particles in the emulsion have an average diameter of 0.1 to 2 μm.

The second aspect of the present invention embraces a process for preparing a long-chain (meth)acrylic ester polymer emulsion, that is, an aqueous emulsion for a pressure-sensitive adhesive, comprising emulsifying and dispersing a monomer mixture containing at least 50% by weight of a long-chain alkyl (meth)acrylate with the alkyl having 9 to 13 carbon atoms in an aqueous radical-polymerizable, emulsifying and dispersing agent solution to bring the monomer mixture to fine particles having an average diameter of not more than 2.0 μm and polymerizing the monomer mixture in the presence of a water-soluble polymerization initiator.

Furthermore, the second aspect of the present invention embraces an embodiment where the content of the long-chain alkyl (meth)acrylate is 50 to less than 75% by weight based on the total weight of the monomer mixture and an embodiment where the content of the long-chain alkyl (meth)acrylate is more than 99.45 to 100% by weight based on the total weight of the monomer mixture.

Furthermore, the second aspect of the present invention embraces an embodiment where the fine particles in the emulsion have an average diameter of 1.0 to 2.0 μm.

A pH buffer and/or a chain transfer agent may be present in the polymerization system.

According to the second aspect of the present invention, the monomer mixture preferably comprises, based on the total weight of the monomer mixture, 75 to 99.45% by weight of the long-chain alkyl (meth)acrylate with the alkyl having 9 to 13 carbon atoms, 0.5 to 20% by weight of an aromatic vinyl monomer, and 0.05 to 5% by weight of a crosslinkable monomer.

The second aspect of the present invention embraces a process for preparing an emulsion type pressure-sensitive adhesive composition, comprising emulsifying and dispersing a monomer mixture comprising as the indispensable components 75 to 99.45% by weight of a long-chain alkyl (meth)acrylate with the alkyl having 9 to 13 carbon atoms, 0.5 to 20% by weight of an aromatic vinyl monomer, and 0.05 to 5% by weight of a monomer having two or more polymerizable double bonds per molecule in an aqueous surfactant solution to bring the monomer mixture to fine particles having an average diameter of 0.1 to 2 μm and polymerizing the monomer mixture in the presence of a water-soluble polymerization initiator.

According to the third aspect of the present invention, there are provided a pressure-sensitive adhesive having an adhesive strength (JIS Z 0237) of peeling against an adherend of 50 to 3000 gf/20 mm and prepared by dehydrating or drying the above aqueous emulsion for a pressure-sensitive adhesive, and a pressure-sensitive adhesive having a holding power (JIS Z 0237) of adhesive strength against an adherend of not more than 20 mm in terms of the distance of displacement after holding for one hr and prepared by dehydrating or drying the above aqueous emulsion for a pressure-sensitive adhesive.

According to the fourth aspect of the present invention, there is provided a pressure-sensitive adhesive product having a pressure-sensitive adhesive layer comprising the above pressure-sensitive adhesive. According to the fifth aspect of the present invention, there is provided the use of the above aqueous emulsion for a pressure-sensitive adhesive for the preparation of a pressure-sensitive adhesive. According to the sixth aspect of the present invention, there is provided a process for preparing a pressure-sensitive adhesive product, comprising coating a support with the above aqueous emulsion for a pressure-sensitive adhesive and dehydrating or drying the emulsion.

A representative embodiment of the present invention relates to a process for preparing an aqueous emulsion for a pressure-sensitive adhesive, comprising bringing a monomer to fine particles with the aid of a polymerizable emulsifying and dispersing agent to prepare an emulsion comprising an aqueous phase as a continuous phase and a monomer layer as a discontinuous phase and polymerizing the monomer in the presence of a water-soluble polymerization initiator, and an aqueous emulsion for a pressure-sensitive adhesive agent prepared by the above process.

This process, as compared with the conventional emulsion polymerization using a micelle as a polymerization field, can stably provide a polymer emulsion which has a better stability and which can provide a pressure-sensitive adhesive excellent in water resistance and tackiness properties. The reason for this is believed to reside in the fact that the polymerizable emulsifying and dispersing agent can be efficiently copolymerized with the monomer on the surfaces of fine particles of the monomer. Therefore, preferably, the polymerizable emulsifying and dispersing agent has high copolymerizability with the monomer as a starting compound. Poor copolymerizability with the monomer as the starting compound makes it impossible to develop the effect contemplated in the present invention.

In the conventional emulsion polymerization using the micelle as the polymerization field, the use of a polymerizable emulsifying and dispersing agent having high copolymerizability with the monomer poses a problem that the polymerizable emulsifying and dispersing agent is copolymerized with the monomer as the starting compound in an early stage of the polymerization and consequently incorporated into the polymer, resulting in lack of the amount of the emulsifying and dispersing agent in the aqueous phase which destabilizes the polymer emulsion in the latter half of the polymerization unfavorably. In the conventional emulsion polymerization using the micelle as the polymerization field, the discontinuous phase changes from fine particles of the monomer to small polymer particles and finally to large polymer particles with the progress of the polymerization. In the course of growth of the particles (discontinuous phase), the polymerizable emulsifying and dispersing agent is incorporated into the polymer as a unit for constituting the polymer. This makes it impossible for the polymerizable emulsifying and dispersing agent to be re-disposed on the surfaces of polymer particles and, at the same time, causes the amount of the emulsifying and dispersing agent present on the surfaces of polymer particles to be unsatisfactory. This is considered to be causative of the destabilization of the polymer emulsion.

In the emulsion polymerization, increasing the amount of the emulsifying and dispersing agent results in an improved stability of the polymer emulsion. When the amount of the emulsifying and dispersing agent is excessively large, however, even the polymerizable emulsifying and dispersing agent is incorporated in a large amount into the resultant polymer emulsion. Therefore, a pressure-sensitive adhesive prepared using the polymer emulsion has unsatisfactory moisture resistance and water resistance.

In the process according to a representative embodiment of the present invention, fine particles of the monomer rather than the micelle are utilized as the polymerization field. Therefore, the progress of the polymerization to grow the fine particles of the monomer into polymer particles scarcely causes any change in the size of particles (discontinuous phase). The polymerizable emulsifying and dispersing agent, even when incorporated into the polymer as a constituent unit of the polymer, aligns on the surfaces of the polymer particles. That is, the polymerizable emulsifying and dispersing agent is fixed by copolymerization on the surfaces of the polymer particles while maintaining the orientation state of adsorption onto the monomer in an early stage of the polymerization, that is, the orientation state of adsorption which is advantageous from the viewpoint of stabilizing the emulsion. By virtue of the scarce change in the size of the discontinuous phase and the alignment of polymer particles of the polymerizable emulsifying and dispersing agent incorporated into the polymer, the above process enables the preparation of a stable polymer emulsion even without the use of a large amount of the polymerizable emulsifying and dispersing agent. This is a point which clearly distinguishes this process from the conventional emulsion polymerization utilizing the micelle as the polymerization field. That is, this process, even when the amount of the polymerizable emulsifying and dispersing agent used is small, can provide a stable polymer emulsion, and a pressure-sensitive adhesive prepared using the polymer emulsion has excellent tackiness properties and environment resistances (such as water resistance and moisture resistance).

Another representative embodiment of the present invention is characterized by the composition of the monomer mixture. Specifically, it relates to a process for preparing an aqueous emulsion for a pressure-sensitive adhesive, comprising bringing a monomer mixture comprising, based on the total weight of the monomer mixture, 75 to 99.45% by weight of a long-chain alkyl (meth)acrylate, 0.5 to 20% by weight of an aromatic vinyl monomer, and 0.05 to 5% by weight of a crosslinkable monomer to fine particles with the aid of a surfactant to prepare an emulsion comprising an aqueous phase as a continuous phase and a monomer phase as a discontinuous phase and then polymerizing the monomer in the presence of a water-soluble polymerization initiator, and also to an aqueous emulsion for a pressure-sensitive adhesive agent prepared by the above process.

This process also uses fine particles of the monomer as the polymerization field-rather than the micelle. Therefore, the conversion of the fine particles of the monomer to the polymer particles as a result of the progress of the polymerization causes scarcely any change in the size of the particles (discontinuous phase), eliminating the need to use a large amount of the surfactant. As a result, this process, even when the amount of the surfactant used is small, can provide a stable polymer emulsion, and a pressure-sensitive adhesive prepared using the polymer emulsion has excellent tackiness properties and environment resistances (such as water resistance and moisture resistance). Further, in this process, since the crosslinkable monomer is used as an indispensable constituent monomer for the polymer, the resultant polymer has an excellent cohesive force. Therefore, a pressure-sensitive adhesive prepared using the polymer emulsion prepared by this process possesses an excellent adhesive strength holding power.

The present invention will now be described in more detail.

DETAILED DESCRIPTION OF THE INVENTION

The monomer mixture according to the present invention comprises at least 50% by weight, preferably at least 70% by weight, based on the total weight of the mixture, of a long-chain alkyl (meth)acrylate with the alkyl having 9 to 13 carbon atoms.

Examples of long-chain alkyl (meth)acrylates usable in the present invention include nonyl (meth)acrylate, isononyl (meth)acrylate, decyl (meth)acrylate, isodecyl (meth) acrylate, dodecyl (meth)acrylate, isododecyl (meth)acrylate, tridecyl (meth)acrylate, and isotridecyl (meth)acrylate. Among them, lauryl (meth)acrylate is most preferred. These long-chain alkyl (meth)acrylates may be used alone or as a mixture of two or more of them.

The alkyl group in the long-chain alkyl (meth)acrylate according to the present invention has 9 to 13 carbon atoms.

When the long-chain alkyl (meth) acrylate used has carbon atoms in the above range, the concurrence of emulsion polymerization utilizing the micelle as the polymerization field is less likely to occur, leading to the preparation of a stable latex (that is, an aqueous emulsion of a polymer). Further, a pressure-sensitive adhesive prepared using the latex has good tackiness properties. Examples of monomers copolymerizable with the long-chain alkyl (meth)acrylate include lower alkyl esters of (meth)acrylic acids, such as butyl acrylate, (meth)acrylic esters with the alkyl having 14 or more carbon atoms, vinyl esters, such as vinyl acetate, aromatic vinyl compounds, such as styrene, nitrile monomers, such as acrylonitrile, amide monomers, such as acrylamide, and carboxylic acid monomers, such as (meth) acrylic acid and maleic acid. If necessary, it is also possible to use a crosslinkable monomer, such as divinylbenzene.

The kind and amount of the monomer to be copolymerized with the long-chain alkyl (meth)acrylate with the alkyl having 9 to 13 carbon atoms greatly influence the stability of a polymer emulsion prepared using the monomer and the tackiness properties of a pressure-sensitive adhesive prepared from the emulsion.

For example, when butyl acrylate is used in an amount exceeding 50% by weight based on the total weight of the monomer mixture, butyl acrylate distributed into the aqueous phase is emulsion-polymerized, resulting in the preparation of a polymer emulsion having a very poor stability. Although the reason for this has not been elucidated yet, it is believed to reside in the fact that emulsion polymerization of butyl acrylate leads to an increase in the number of particles in the emulsion, which renders the amount of the emulsifying agent necessary for the stabilization unsatisfactory. When the amount of the emulsifying agent is large, the stability of the latex is improved. This, however, results in increased emulsion polymerization of butyl acrylate, further increasing the heterogeneity of the composition of the polymer emulsion. Thus, the use of the alkyl (meth)acrylate with the alkyl having 8 or less carbon atoms in a large amount leads to heterogenization of the composition of the polymer emulsion, which in turn results in deteriorated tackiness properties and water resistance of a pressure-sensitive adhesive prepared using the polymer emulsion.

When the amount of the long-chain alkyl (meth)acrylate with the alkyl having 9 to 13 carbon atoms used is at least 50% by weight based on the total weight of the monomer mixture, a polymer emulsion having an excellent stability can be prepared. Further, in this case, a pressure-sensitive adhesive prepared from this polymer emulsion is excellent in weather resistance, water resistance, adhesion to nonpolar adherends, and other properties.

The monomer mixture according to the present invention comprises, based on the total weight of the monomer mixture, 75 to 99.45% by weight of the long-chain alkyl (meth)acrylate with the alkyl having 9 to 13 carbon atoms, 0.5 to 20% by weight of an aromatic vinyl monomer, and 0.05 to 5% by weight of a crosslinkable monomer.

Examples of aromatic vinyl monomers usable herein include styrene, α-methylstyrene, and p-methylstyrene. Among them, styrene is most preferred from the viewpoints of profitability and performances.

Preferred examples of crosslinkable monomers include monomers having two or more polymerizable double bonds in one molecule. Specific examples thereof include divinylbenzene, polyethylene glycol di(meth)acrylate, hexanediol di(meth)acrylate, and trimethylolpropane tri(meth)acrylate.

In the present invention, when a monomer mixture comprising the above three monomers as the indispensable components is used, acrylic acid, methacrylic acid, vinyl acetate, acrylamide, acrylonitrile or the like may also be used as the comonomer. Preferably, the above comonomer is used in an amount of not more than 25% by weight based on the total weight of the monomer mixture from the viewpoint of the tackiness properties of a pressure-sensitive adhesive prepared using the monomer mixture.

In the monomer mixture comprising the above three monomers as the indispensable components, when the long-chain alkyl (meth)acrylate, the aromatic vinyl monomer, and the crosslinkable monomer are used in respective ranges, a pressure-sensitive adhesive prepared from a polymer emulsion prepared using the monomer mixture has an excellent balance among weather resistance, water resistance, tack, adhesive strength, adhesive strength holding power, adhesion to nonpolar adherends, and other properties. The amount of the aromatic vinyl monomer used is preferably 1 to 10% by weight based on the total weight of the monomer mixture.

The surfactant used in the present invention may be any of anionic, nonionic, cationic, and amphoteric surfactants.

Examples of anionic surfactants usable herein include salts of alkyl arylsulfonates, salts of alkyl diphenyl ether sulfonates, salts of alkyl sulfates, salts of polyoxyethylene alkyl ether sulfates, salts of dialkyl sulfosuccinates, salts of alkyl phosphates, salts of polyoxyethylene alkyl ether phosphates, salts of perfluoroalkyl sulfates, salts of acylsarcosinates, fatty acid soaps, and salts of alkenylsuccinic acids.

Examples of nonionic surfactants include polyoxyethylene alkyl ethers, polyoxyethylene alkylaryl ethers, fatty acid esters of polyoxyethylene glycol, a block copolymer of propylene oxide with ethylene oxide, glycerin derivatives, sorbitan derivatives, and glycol derivatives.

Examples of cationic surfactants include long-chain alkylamines, long-chain alkyl quaternary ammonium salts.

Examples of amphoteric surfactants include betaine derivatives and sulfobetaine derivatives. Further, water-soluble polymers, such as polyvinyl alcohol and derivatives thereof, starch and derivatives thereof, cellulose derivatives, and polyacrylic acid oligomers, may also be used as the emulsifying and dispersing agent in the present invention.

In the present invention, the use of a polymerizable emulsifying and dispersing agent as the surfactant is preferred. Still preferably, an emulsifying and dispersing agent having a radical-polymerizable double bond in its molecule is used. The polymerizable emulsifying and dispersing agent may have any chemical structure. It may be any of anionic, nonionic, cationic, and amphoteric polymerizable emulsifying and dispersing agents, preferably an anionic or nonionic one, still preferably an anionic one.

The polymerizable emulsifying and dispersing agent used in the present invention, unlike the emulsifying and dispersing agents used in the conventional emulsification polymerization, does not necessarily require the formation of a micelle. Therefore, the polymerizable emulsifying and dispersing agent may be selected from the viewpoint of the copolymerizability with the monomer, the emulsifiability of the monomer, and the capability of dispersing polymer particles. A surfactant having in its molecule a polymerizable group, such as an allyl, (meth)acrylic acid, styrene, or isopropenyl group, is known as the polymerizable emulsifying and dispersing agent and may be used as the polymerizable emulsifying and dispersing agent in the present invention. In general, the hydrophobic group in the surfactant has 8 to 20 carbon atoms, and, since the polymerizable emulsifying and dispersing agent used in the present invention also is a kind of the surfactant, the hydrophobic group preferably has 8 to 20 carbon atoms. Examples of polymerizable emulsifying and dispersing agents usable in the present invention are as follows:

(see JP-A 53-126093 and U.S. Pat. No. 4,200,563);

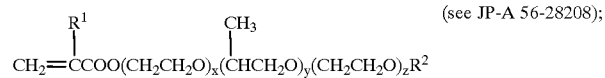
(see JP-A 56-28208);

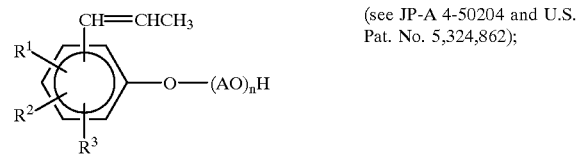
(see JP-A 4-50204 and U.S. Pat. No. 5,324,862);

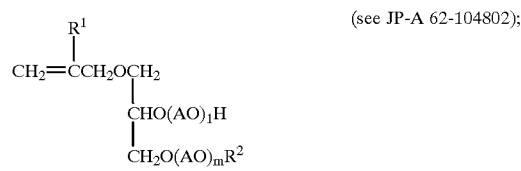
(see JP-A 62-104802);

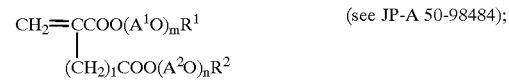
(see JP-A 50-98484);

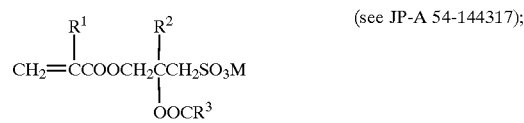
(see JP-A 54-144317);

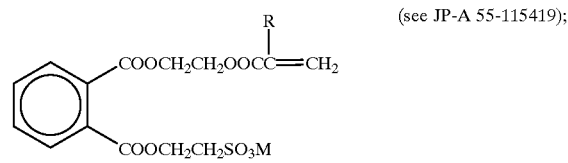
(see JP-A 55-115419);

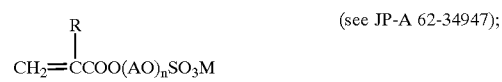
(see JP-A 62-34947);

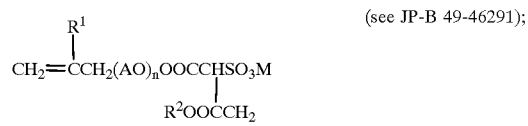
(see JP-B 49-46291);

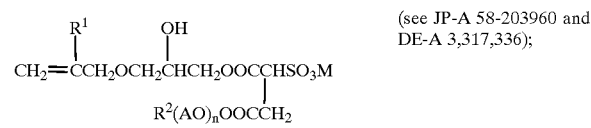
(see JP-A 58-203960 and DE-A 3,317,336);

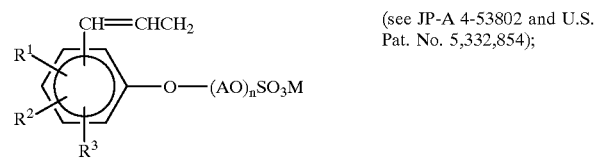
(see JP-A 4-53802 and U.S. Pat. No. 5,332,854);

-continued

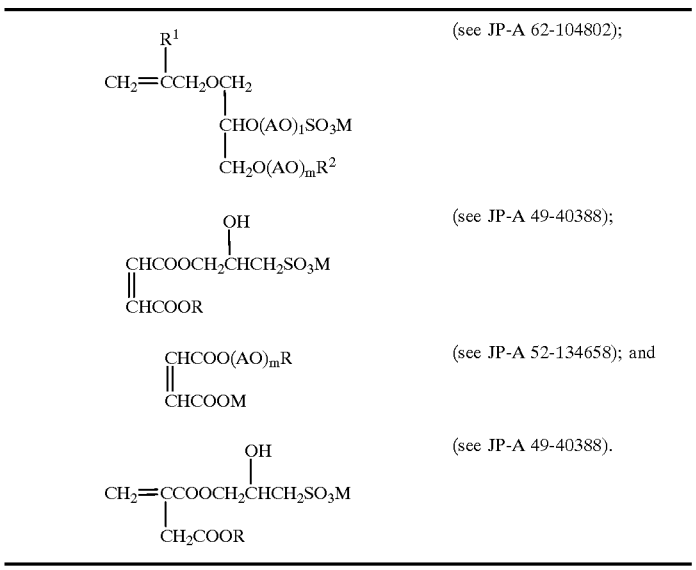

(see JP-A 62-104802);

(see JP-A 49-40388);

(see JP-A 52-134658); and (see JP-A 49-40388).

In the above chemical structures, R, $R^1$, $R^2$, and $R^3$ each represents a hydrogen atom, an alkyl group or the like, M represents an alkali metal or the like, AO, $A^1O$, and $A^2O$ each represents an oxyalkylene group, and l, m, n, x, y, and z each is 0 or an integer.

In the present invention, a mixture of a radical-polymerizable emulsifying and dispersing agent with an emulsifying and dispersing agent not having a polymerizable group may be used.

Examples of emulsifying and dispersing agents not having a polymerizable group usable in combination with the radical-polymerizable emulsifying and dispersing agent include anionic surfactants, such as salts of alkyl arylsulfonates, salts of alkyl diphenyl ether sulfonates, salts of alkyl sulfates, salts of polyoxyethylene alkyl ether sulfates, salts of dialkyl sulfosuccinates, salts of alkyl phosphates, salts of polyoxyethylene alkyl ether phosphates, salts of perfluoroalkyl sulfates, salts of acylsarcosinates, fatty acid soaps, and salts of alkenylsuccinic acids. Further examples thereof include nonionic surfactants, such as polyoxyethylene alkyl ethers, polyoxyethylene alkylaryl ethers, fatty acid esters of polyoxyethylene glycol, a block copolymer of propylene oxide with ethylene oxide, glycerin derivatives, sorbitan derivatives, and glycol derivatives. Furthermore, it is also possible to use a cationic surfactant, an amphoteric surfactant, and/or a water-soluble polymer compound. The emulsifying and dispersing agent not having a polymerizable group is used in an amount of preferably not more than 50% by weight, still preferably not more than 20% by weight, based on the weight of the radical-polymerizable emulsifying and dispersing agent.

In the present invention, although the amount of the surfactant used is not limited, it is preferably 0.1 to 10%, by weight, particularly preferably 0.5 to 5% by weight, based on the total weight of the monomer mixture. The use of the surfactant in this amount range results in the preparation of a stable polymer emulsion and permits a pressure-sensitive adhesive prepared from the polymer emulsion to possess excellent tackiness properties, weather resistance, and water resistance.

Although the amount of the polymerizable emulsifying and dispersing agent to be used is not limited, it is preferably 0.1 to 5% by weight, particularly preferably 0.5 to 3% by weight, based on the total weight of the monomer mixture. The use of the polymerizable emulsifying and dispersing agent in the above amount range results in the preparation of a stable polymer emulsion from which a pressure-sensitive adhesive having tackiness properties, weather resistance, and water resistance can be prepared.

In the present invention, although the proportions of the monomer mixture and the surfactant (including the polymerizable emulsifying and dispersing agent) are not limited, the amount of the monomer mixture is preferably in the range of from 5 to 80% by weight based on the total weight of the polymerization system, that is, the emulsification product. The use of the monomer mixture in the above amount range enables a polymer emulsion to be economically and easily prepared.

The polymerization initiator used in the present invention is a water-soluble polymerization initiator commonly used in the conventional emulsification polymerization. Examples of polymerization initiators usable herein include salts of persulfuric acid, such as potassium persulfate and ammonium persulfate, and azo polymerization initiators, such as 2,2'-azobis(2-amidinopropane) hydrochloride and azobiscyanovaleric acid. Further, in the present invention, a redox polymerization initiator may be used. Examples of redox polymerization initiators usable herein include a combination of a hydroperoxide polymerization initiator with ascorbic acid, a combination of a hydroperoxide polymerization initiator with iron ion, a combination of a salt of persulfuric acid with a salt of sulfurous acid, and a combination of hydrogen peroxide with iron ion. In the present invention, the redox polymerization initiator is preferably used, and the use of a redox polymerization initiator comprising a combination of t-butyl hydroperoxide with a water-soluble reducing agent, such as ascorbic acid, is most preferred because of high polymerization rate and high degree of polymerization and, at the same time, the preparation of a polymer emulsion having an excellent stability.

Although the amount of the polymerization initiator used is not limited, it is preferably 0.01 to 5% by weight, still preferably 0.05 to 1% by weight, based on the total weight of the monomer mixture.

The polymerization system of the present invention may optionally contain a pH buffer, such as a salt of phosphoric acid or a salt of carbonic acid. Further, a radical chain transfer agent, such as dodecylmercaptan, may also be used in order to regulate the molecular weight of the polymer prepared.

The process for preparing an aqueous emulsion for a pressure-sensitive adhesive according to the present invention may be divided into the step of emulsifying and dispersing a monomer and the step of polymerizing the monomer. In the step of emulsifying and dispersing a monomer, a mixture of a monomer, water, and a surfactant is subjected to emulsification using an emulsifier. In this case, the emulsification is conducted so that the average diameter of fine particles of the monomer does not exceed 2 μm, preferably ranges from 0.1 to 2 μm.

An emulsifier is used for the emulsification of the monomer. The emulsifier to be used in the present invention may be of any type so far as it can bring the average diameter of fine particles of the monomer to not more than 2 μm, preferably 0.1 to 2 μm. Examples of emulsifiers usable herein include ultrasonic homogenizers, homomixers, milders, attritors, (ultra)high-pressure homogenizers, and colloid mills.

After the above emulsification product is introduced into a polymerization container equipped with a stirrer, the above polymerization initiator is added thereto and the polymerization system is heated to a suitable temperature to initiate a polymerization reaction. In this case, preferably, the polymerization system is placed in an inert gas atmosphere, such as nitrogen. Specifically, the purging of oxygen in the polymerization system with the inert gas before polymerization is preferred from the viewpoint of preventing the inhibition of polymerization by oxygen.

A suitable polymerization temperature is in the range of from about 40 to 90° C. although it varies depending upon the composition of the polymer mixture and the kind of the polymerization initiator. The polymerization time is generally 1 to 10 hr although it varies depending upon the composition of the polymer mixture, the kind of the polymerization initiator, and the polymerization temperature.

Both the average particle diameter of the discontinuous phase (fine particles of the monomer) in the emulsification product prepared in the step of emulsification and the average particle diameter of the discontinuous phase (polymer) in the polymer emulsion prepared through the step of polymerization are 0.1 to 2 μm. Further, both the emulsification product prepared in the step of emulsification and the polymer emulsion have a good stability.

The polymer constituting the aqueous emulsion for a pressure-sensitive adhesive according to the present invention has a weight-average molecular weight of generally 100,000 to 3,000,000, preferably 300,000 to 2,000,000, still preferably 500,000 to 12,00,000, in terms of polystyrene as determined by GPC. Since the long-chain alkyl (meth) acrylate with the alkyl having 9 to 13 carbon atoms is sparingly soluble in water, the conventional emulsification cannot provide a stable polymer emulsion. When the monomer is sparingly soluble in water, suspension polymerization using an oil-soluble polymerization initiator tentatively results in the preparation of a stable polymer emulsion. In this case, however, the weight-average molecular weight of the polymer constituting the polymer emulsion is as low as 100,000 to 500,000. Therefore, when this polymer emulsion is used in a pressure-sensitive adhesive, the pressure-sensitive adhesive has a poor holding power. In the present invention, a water-soluble polymerization initiator is used and the polymerization reaction is initiated using a radical generated in the aqueous system. As a result, a stable polymer emulsion comprising a polymer having a high molecular weight can be prepared despite the use of a sparingly water-soluble monomer.

The dehydration or drying of the aqueous emulsion for a pressure-sensitive adhesive according to the present invention by the conventional method can provide a pressure-sensitive adhesive. The pressure-sensitive adhesive of the present invention has an adhesive strength of 50 to 3000 gf/20 mm (as measured by a 180 degree peeling) according to JIS Z 0237. Further, the pressure-sensitive adhesive has such an adhesive strength holding power, when measured according to JIS Z 0237 (load: 500 g, temperature: 80° C.), that it can hold an adherend for one hr and the distance of displacement is not more than 20 mm.

The pressure-sensitive adhesive product according to the present invention comprises a pressure-sensitive adhesive layer formed of the above pressure-sensitive adhesive. Such a pressure-sensitive adhesive product is prepared by applying the aqueous emulsion for a pressure-sensitive adhesive according to the present invention onto a support by the conventional method and then dehydrating or drying the coating. Examples of supports usable herein include papers such as kraft paper and Japanese paper, cloths of cotton fibers and polyester fibers, films of plastics such as polyvinyl chloride and polyesters, sheets of rubbers such as natural rubbers and synthetic rubbers, foams such as foamed polyurethane and foamed polyesters, and foils of metals such as aluminum and stainless steel.

The pressure-sensitive adhesive of the present invention prepared from the aqueous emulsion for a pressure-sensitive adhesive according to the present invention, as compared with the conventional emulsion type pressure-sensitive adhesives, is superior in environment resistances such as moisture resistance, water resistance, and weather resistance and, in addition, the adhesion to nonpolar adherends such as polyolefin plastics to the conventional emulsion type pressure-sensitive adhesives. Further, the pressure-sensitive adhesive of the present invention is prepared by a process using no organic solvent and hence is less likely to generate pollution, contributes to resource saving or an improvement in an environment where it is prepared or used, is less likely to cause a fire, and is easy to handle. Therefore, the pressure-sensitive adhesive of the present invention is very advantageous over the organic solvent type pressure-sensitive adhesives.

The long-chain alkyl (meth)acrylate polymer per se possesses excellent weather resistance, water resistance, and adhesion to nonpolar adherends. In the prior art, however, the preparation of a stable polymer emulsion of a long-chain alkyl (meth)acrylate polymer has been difficult and, further, the use of this polymer emulsion prepared by the conventional emulsion polymerization poses a problem that the above excellent properties cannot be satisfactorily exhibited due to the presence of the emulsifier. By contrast, the process using a polymerizable emulsifying and dispersing agent according to the present invention can solve this problem.

The long-chain alkyl (meth)acrylate polymer has the problem of an unsatisfactory adhesive strength holding power due to an unsatisfactory cohesive force. Adoption of an embodiment in the process according to the present invention, wherein a monomer mixture having a particular composition comprising the long-chain alkyl (meth)acrylate as the main component and, in addition, other monomer(s)

is used as the starting material, can stably prepare an aqueous emulsion for a pressure-sensitive adhesive from which a pressure-sensitive adhesive possessing well-balanced tackiness properties can be prepared.

EXAMPLES

The present invention will now be described in more detail with reference to the following Examples and Comparative Examples, though it is not limited to these examples only.

In the following Examples and Comparative Examples, "%" is "by weight" unless otherwise specified. The weight-average molecular weight of the polymer is a value in terms of polystyrene as measured by GPC. The average particle diameter was measured with a particle diameter distribution measuring instrument (model LA-700) manufactured by HORIBA, Ltd. The tackiness properties of the pressure-sensitive adhesive were measured by the following methods according to JIS Z 0237.

[Methods for Measuring Tackiness Properties]

Examples A-1 to A-6

(1) Ball Tack

The corona-treated surface of a PET (polyethylene terephthalate) film was coated with an aqueous emulsion for a pressure-sensitive adhesive to a thickness of 30 μm on a pressure-sensitive adhesive basis, and the emulsion was then dried in a hot air drier (105° C./3 min). Thus, a pressure-sensitive adhesive tape was prepared. For this pressure-sensitive adhesive tape, the tack was measured by the rolling ball method under the conditions of 23° C. and 65% RH.

(2) Adhesive Strength

A pressure-sensitive adhesive tape was prepared in the same manner as described above in connection with the ball tack test (1). The pressure-sensitive adhesive tape (width: 20 mm) was applied to various adherends. After the adherend with the pressure-sensitive adhesive tape applied thereto was allowed to stand for one day under the conditions of 23° C. and 65% RH, the adhesive strength of 180 degree peeling against the adherend (peeling rate: 300 mm/min) was measured under the conditions of 23° C. and 65% RH.

(3) Holding Power

A pressure-sensitive adhesive tape was prepared in the same manner as described above in connection with the ball tack test (1). The pressure-sensitive adhesive tape was applied to a stainless steel plate so that a 20 mm×25 mm area of the pressure-sensitive adhesive tape came into contact with the stainless steel plate. A load of 500 g was applied at 80° C. to the pressure-sensitive adhesive tape to measure the time elapsed until the tape peels and drops from the plate. When the tape did not peel and drop from the plate for one hr, the distance of displacement of the tape was measured.

(4) Water Immersion Test

A pressure-sensitive adhesive tape was prepared in the same manner as described above in connection with the ball tack test (1). The pressure-sensitive adhesive tape (width 20 mm) was applied to various adherends. After the adherend with the pressure-sensitive adhesive tape applied thereto was allowed to stand for one day under the conditions of 23° C. and 65% RH, it was immersed in water at 25° C. for three days. Immediately after pulling up the adherend with the pressure-sensitive adhesive tape applied thereto from water, the adhesive strength of 180 degree peeling against the adherend (peeling rate: 300 mm/min) was measured under the conditions of 23° C. and 65% RH.

Examples B-1 to B-10

(5) Ball Tack

A PET (polyethylene terephthalate) film was coated with an aqueous emulsion for a pressure-sensitive adhesive to a ti thickness of 30 μm on a pressure-sensitive adhesive basis, and the emulsion was then dried in a hot air drier (120° C./3 min) Thus, a pressure-sensitive adhesive tape was prepared. For this pressure-sensitive adhesive tape, the tack was measured by the rolling ball method under the conditions of 23° C. and 65% RH.

(6) Adhesive Strength

A pressure-sensitive adhesive tape was prepared in the same manner as described above in connection with the ball tack test (5). A stainless steel plate was provided as an adherend, and the pressure-sensitive adhesive tape (width 20 mm) was applied thereto. After the adherend with the pressure-sensitive adhesive tape applied thereto was allowed to stand for one day under the conditions of 23° C. and 65% RH, the adhesive strength of 180 degree peeling against the adherend (peeling rate: 300 mm/min) was measured under the conditions of 23° C. and 65% RH.

(7) Holding Power

A pressure-sensitive adhesive tape was prepared in the same manner as described above in connection with the ball tack test (5). The pressure-sensitive adhesive tape was applied to a stainless steel plate so that a 20 mm×25 mm area of the pressure-sensitive adhesive tape came into contact with the stainless steel plate. A load of 500 g was applied at 80° C. to the pressure-sensitive adhesive tape to measure the time elapsed until the tape peels and drops from the plate. When the tape did not peel and drop from the plate for one hr, the distance of displacement of the tape was measured.

Emulsifying and dispersing agents respectively comprising active ingredients having the following chemical structures were used in the Examples and Comparative Examples.

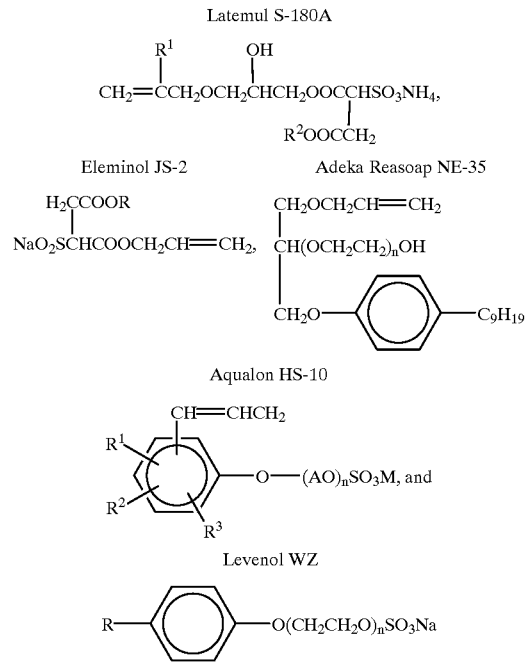

Example A-1

510 g of an aqueous Latemul S-180A (a polymerizable surfactant, manufactured by Kao Corp.) solution having an active ingredient concentration of 2% was placed in a 2-l container, and 450 g of lauryl methacrylate was added thereto. The mixture was treated for three min in a high-pressure homogenizer (manufactured by Izumi Food Machinery Co., Ltd.) to prepare an emulsification product with particles in the discontinuous phase having an average diameter of 0.48 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 2.2 g of t-butyl hydroperoxide as a polymerization initiator in 20 g of water and a solution of 2.2 g of L-ascorbic acid as a polymerization initiator in 20 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion little contained an agglomerate. For the polymer emulsion, the solid content was 45.2%, the average diameter of particles in the discontinuous phase was 0.45 μm, and the stability was good. The polymer in the polymer emulsion had a weight-average molecular weight of 1,250,000.

The tackiness properties of a pressure-sensitive adhesive prepared using the above polymer emulsion are summarized in Table 1.

Example A-2

510 g of an aqueous Aqualon HS-10 (a polymerizable surfactant, manufactured by Dai-Ichi Kogyo Seiyaku Co., Ltd.) solution having an active ingredient concentration of 2% was placed in a 2-l container, and a mixture of 200 g of n-nonyl methacrylate with 250 g of isotridecyl methacrylate was added thereto. The mixture was treated for 10 min in an ultrasonic homogenizer (manufactured by Nippon Seiki Co., Ltd.) to prepare an emulsification product with particles in the discontinuous phase having an average diameter of 0.36 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 2.2 g of t-butyl hydroperoxide as a polymerization initiator in 20 g of water and a solution of 2.2 g of L-ascorbic acid as a polymerization initiator in 20 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion little contained an agglomerate. For the polymer emulsion, the solid content was 44.8%, the average diameter of particles in the discontinuous phase was 0.35 μm, and the stability was good. The polymer in the polymer emulsion had a weight-average molecular weight of 850,000.

The tackiness properties of a pressure-sensitive adhesive prepared using the above polymer emulsion are summarized in Table 1.

Example A-3

100 g of an aqueous Adeka Reasoap NE-30 (a polymerizable surfactant, manufactured by Asahi Denka Kogyo Ltd.) solution having an active ingredient concentration of 2% was placed in a 2-l container, and 410 g of a 2% aqueous Eleminol JS-2 (a polymerizable surfactant, manufactured by Sanyo Chemical Industries, Ltd.) was added thereto. A mixture composed of 368 g of lauryl methacrylate, 2 g of acrylic acid, and 80 g of butyl acrylate was added to the mixed solution. The mixture was treated for 10 min in an ultrasonic homogenizer (manufactured by Nippon Seiki Co., Ltd.) to prepare an emulsification product with particles in the discontinuous phase having an average diameter of 0.45 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 2.2 g of t-butyl hydroperoxide as a polymerization initiator in 20 g of water and a solution of 2.2 g of L-ascorbic acid as a polymerization initiator in 20 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion little contained an agglomerate. For the polymer emulsion, the solid content was 45.6%, the average diameter of particles in the discontinuous phase was 0.43 μm, and the stability was good. The polymer in the polymer emulsion had a weight-average molecular weight of 1,100,000.

The tackiness properties of a pressure-sensitive adhesive prepared using the above polymer emulsion are summarized in Table 1.

Example A-4

510 g of an aqueous Latemul S-180A (a polymerizable surfactant, manufactured by Kao Corp.) solution having an active ingredient concentration of 2% was placed in a 2-l container, and a mixture composed of 400 g of lauryl acrylate, 50 g of tetradecyl acrylate, and 0.2 g of divinylbenzene was added to the mixed solution. The mixture was treated for 10 min in an ultrasonic homogenizer (manufactured by Nippon Seiki Co., Ltd.) to prepare an emulsification product with particles in the discontinuous phase having an average diameter of 0.40 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 2.2 g of t-butyl hydroperoxide as a polymerization initiator in 20 g of water and a solution of 2.2 g of L-ascorbic acid as a polymerization initiator in 20 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion little contained an agglomerate. For the polymer emulsion, the solid content was 44.9%, the average diameter of particles in the discontinuous phase was 0.38 μm, and the stability was good. The polymer in the polymer emulsion had a weight-average molecular weight of 1,500,000.

The tackiness properties of a pressure-sensitive adhesive prepared using the above polymer emulsion are summarized in Table 1.

Comparative Example A-1

510 g of an aqueous Latemul S-180A (a polymerizable surfactant, manufactured by Kao Corp.) solution having an active ingredient concentration of 2% was placed in a 2-l container, and 450 g of 2-ethylhexyl acrylate was added thereto. The mixture was treated for 10 min in an ultrasonic homogenizer (manufactured by Nippon Seiki Co., Ltd.) to prepare an emulsification product with particles in the discontinuous phase having an average diameter of 0.58 μm This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 2.2 g of t-butyl hydroperoxide as a polymerization initiator in 20 g of water and a solution of 2.2 g of L-ascorbic acid as a polymerization initiator in 20 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared. The polymer in the polymer emulsion had a weight-average molecular weight of 900,000.

This polymerization reaction resulted in the formation of an agglomerate in an amount of 3.9% based on the weight of the monomer component used. The average diameter of particles in the discontinuous phase of the polymer emulsion was 0.11 μm. The average diameter of particles in the discontinuous phase of the polymer emulsion after the completion of the polymerization was much smaller than the average diameter (0.58 μm) of particles in the emulsification product of the starting monomer component. The formation of polymer particles having a small diameter suggests that emulsification polymerization in a micelle form has been conducted. That is, the results of the measurement of the diameter of particles in the discontinuous phase of the emulsion show that, for Comparative Example A-1, conventional emulsion polymerization significantly occurred.

The tackiness properties of a pressure-sensitive adhesive prepared using the above polymer emulsion are summarized in Table 1.

As is apparent from Table 1, as compared with the pressure-sensitive adhesives prepared using the polymer emulsions of Examples A-1 to A-4, the pressure-sensitive adhesive prepared using the polymer emulsion of Comparative Example A-1 had an inferior adhesive strength and the lowering in adhesive strength in the water immersion test was larger.

TABLE 1

| | Ball tack | Adhesive strength (gf/20 mm) | | | Holding power | Water immersion test (adhesive strength after 3-day immersion period: gf/20 mm) | | |
|---|---|---|---|---|---|---|---|---|
| | | SUS | PE | PP | | SUS | PE | PP |
| Ex. A-1 | 6 | 980 | 1150 | 1210 | 0.2 mm | 960 | 1160 | 1180 |
| Ex. A-2 | 7 | 870 | 1030 | 1090 | 0.6 mm | 830 | 1040 | 1060 |
| Ex. A-3 | 6 | 850 | 980 | 920 | 0.3 mm | 840 | 1000 | 930 |
| Ex. A-4 | 4 | 740 | 770 | 760 | 0 mm | 730 | 750 | 770 |
| Comp. Ex. A-1 | 7 | 470 | 440 | 470 | 0.5 mm | 260 | 310 | 280 |

Adherend SUS: SUS 304 plate, PE: polyethylene plate, PP: polypropylene plate

Example B-1

600 g of an aqueous Levenol WZ (an anionic surfactant, manufactured by Kao Corp.) solution having an active ingredient concentration of 1.5% was placed in a 2-l container, and 450 g of a mixture composed of 367.2 g of lauryl methacrylate, 20 g of styrene, 0.8 g of divinylbenzene, and 12 g of acrylic acid was added thereto. The mixture was treated for three min in a high-pressure homogenizer (manufactured by Izumi Food Machinery Co., Ltd.) to prepare an emulsification product with particles in the discontinuous phase having an average diameter of 0.48 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 0.8 g of t-butyl hydroperoxide as a polymerization initiator in 10 g of water and a solution of 0.8 g of L-ascorbic acid as a polymerization initiator in 10 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion little contained an agglomerate. For the polymer emulsion, the solid content was 40.7%, the average diameter of particles in the discontinuous phase was 0.45 μm, and the storage stability was good.

The tackiness properties of a pressure-sensitive adhesive prepared using the above polymer emulsion are summarized in Table 2.

Example B-2

600 g of an aqueous sodium poly (9) oxyethylene nonylphenyl ether sesquiphosphate solution having an active ingredient concentration of 1.5% was placed in a 2-l container, and a mixture composed of 376.0 g of decyl methacrylate, 12 g of styrene, 4.0 g of ethylene glycol dimethacrylate, and 8.0 g of acrylic acid was added thereto. The mixture was treated for 10 min in an ultrasonic homogenizer (manufactured by Nippon Seiki Co., Ltd.) to prepare an emulsification product with particles in the discontinuous phase having an average diameter of 0.36 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 0.8 g of t-butyl hydroperoxide as a polymerization initiator in 10 g of water and a solution of 0.8 g of L-ascorbic acid as a polymerization initiator in 10 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion little contained an agglomerate. For the polymer emulsion, the solid content was 40.5%, the average diameter of particles in the discontinuous phase was 0.35 μm, and the storage stability was good.

The tackiness properties of a pressure-sensitive adhesive prepared using the above polymer emulsion are summarized in Table 2.

Example B-3

300 g of an aqueous Levenol WZ (an anionic surfactant, manufactured by Kao Corp.) solution having an active ingredient concentration of 1.5% was placed in a 2-l container, and 300 g of an aqueous poly (20) oxyethylene lauryl ether having an active ingredient concentration of 1.5% was added thereto. A mixture composed of 362.4 g of lauryl methacrylate, 24 g of styrene, 1.6 g of divinylbenzene, and 12.0 g of diacetone acrylamide was added to the mixed solution. The mixture was treated for 10 min in an ultrasonic homogenizer (manufactured by Nippon Seiki Co., Ltd.) to prepare an emulsification product with particles in the discontinuous phase having an average diameter of 0.45 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 0.8 g of t-butyl hydroperoxide as a polymerization initiator in 10 g of water and a solution of 0.8 g of L-ascorbic acid as a polymerization initiator in 10 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion little contained an agglomerate. For the polymer emulsion, the solid content was 40.6%, the average diameter of particles in the discontinuous phase was 0.43 μm, and the storage stability was good.

The tackiness properties of a pressure-sensitive adhesive prepared using the above polymer emulsion are summarized in Table 2.

Example B-4

600 g of an aqueous Levenol WZ (an anionic surfactant, manufactured by Kao Corp.) solution having an active ingredient concentration of 1.5% was placed in a 2-l container, and a mixture composed of 363.2 g of lauryl acrylate, 12 g of styrene, 0.8 g of divinylbenzene, and 24.0 g of butyl acrylate was added to the mixed solution. The mixture was treated for 10 min in an ultrasonic homogenizer (manufactured by Nippon Seiki Co., Ltd.) to prepare an emulsification product with particles in the discontinuous phase having an average diameter of 0.35 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

0.8 g of ammonium persulfate as a polymerization initiator was added to the emulsification product to initiate polymerization. Thereafter, in order to complete the polymerization, the emulsification product was held at 80° C. for five hr. Thus, a polymer emulsion (that is, an aqueous emulsion for a pressure-sensitive adhesive) was prepared.

This polymer emulsion little contained an agglomerate. For the polymer emulsion, the solid content was 40.4%, the average diameter of particles in the discontinuous phase was 0.32 μm, and the storage stability was good.

The tackiness properties of a pressure-sensitive adhesive prepared using the above polymer emulsion are summarized in Table 2.

Example B-5

300 g of an aqueous Levenol WZ (an anionic surfactant, manufactured by Kao Corp.) solution having an active ingredient concentration of 1.5% was placed in a 2-l container, and 300 g of an aqueous poly(20)oxyethylene lauryl ether solution having an active ingredient concentration of 1.5% was added thereto. A mixture composed of 362.4 g of tridecyl methacrylate, 24 g of styrene, 1.6 g of divinylbenzene, and 12.0 g of diacetone acrylamide was added to the mixed solution. The mixture was treated for 10 min in an ultrasonic homogenizer (manufactured by Nippon Seiki Co., Ltd.) to prepare an emulsification product with particles in the discontinuous phase having an average diameter of 0.45 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 0.8 g of t-butyl hydroperoxide as a polymerization initiator in 10 g of water and a solution of 0.8 g of L-ascorbic acid as a polymerization initiator in 10 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion little contained an agglomerate. For the polymer emulsion, the solid content was 40.5%, the average diameter of particles in the discontinuous phase was 0.42 μm, and the storage stability was good.

The tackiness properties of a pressure-sensitive adhesive prepared using the above polymer emulsion are summarized in Table 2.

Example B-6

600 g of an aqueous Levenol WZ (an anionic surfactant, manufactured by Kao Corp.) solution having an active ingredient concentration of 1.5% was placed in a 2-l container, and a mixture composed of 363.2 g of isononyl methacrylate, 12 g of styrene, 0.8 g of divinylbenzene, and 24.0 g of butyl acrylate was added to the mixed solution. The mixture was treated for 10 min in an ultrasonic homogenizer (manufactured by Nippon Seiki Co., Ltd.) to prepare an emulsification product with particles in the discontinuous phase having an average diameter of 0.38 μm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 0.8 g of t-butyl hydroperoxide as a polymerization initiator in 10 g of water and a solution of 0.8 g of L-ascorbic acid as a polymerization initiator in 10 g of water were added to the emulsification product to initiate polymerization. Thereafter, in order to complete the polymerization, the emulsification product was held at 80° C. for five hr. Thus, a polymer emulsion (that is, an aqueous emulsion for a pressure-sensitive adhesive) was prepared.

This polymer emulsion little contained an agglomerate. For the polymer emulsion, the solid content was 40.4%, the average diameter of particles in the discontinuous phase was 0.36 μm, and the storage stability was good.

The tackiness properties of a pressure-sensitive adhesive prepared using the above polymer emulsion are summarized in Table 2.

Example B-7

600 g of an aqueous Levenol WZ (an anionic surfactant, manufactured by Kao Corp.) solution having an active ingredient concentration of 1.5% was placed in a 2-l container, and a mixture composed of 370.4 g of lauryl acrylate, 8.0 g of p-methylstyrene, 1.6 g of divinylbenzene, and 20.0 g of methacrylic acid was added thereto. The mixture was treated for 20 min in a milder (Ebara Milder, manufactured by Ebara Corp.) to prepare an emulsification product with particles in the discontinuous phase having an average diameter of 1.20 µm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 0.8 g of t-butyl hydroperoxide as a polymerization initiator in 10 g of water and a solution of 0.8 g of L-ascorbic acid as a polymerization initiator in 10 g of water were added to the emulsification product to initiate polymerization. Thereafter, in order to complete the polymerization, the emulsification product was held at 80° C. for five hr. Thus, a polymer emulsion (that is, an aqueous emulsion for a pressure-sensitive adhesive) was prepared.

This polymer emulsion little contained an agglomerate. For the polymer emulsion, the solid content was 40.8%, the average diameter of particles in the discontinuous phase was 1.23 µm, and the storage stability was good.

The tackiness properties of a pressure-sensitive adhesive prepared using the above polymer emulsion are summarized in Table 2.

Comparative Example B-1

600 g of an aqueous Levenol WZ (an anionic surfactant, manufactured by Kao Corp.) solution having an active ingredient concentration of 1.5% was placed in a 2-l container, and 400 g of 2-ethylhexyl acrylate was added thereto. The mixture was treated for 10 min in an ultrasonic homogenizer (manufactured by Nippon Seiki Co., Ltd.) to prepare an emulsification product with particles in the discontinuous phase having an average diameter of 2.5 µm.

This emulsification product was transferred to a 2-l glass reactor equipped with a stirrer, a condenser, and a nitrogen inlet tube, and air in the container was purged with a nitrogen gas. The emulsification product was heated with stirring to 70° C.

A solution of 0.8 g of t-butyl hydroperoxide as a polymerization initiator in 10 g of water and a solution of 0.8 g of L-ascorbic acid as a polymerization initiator in 10 g of water were added to the emulsification product to initiate polymerization. Thereafter, in order to complete the polymerization, the emulsification product was held at 80° C. for three hr. Thus, a polymer emulsion (that is, an aqueous emulsion for a pressure-sensitive adhesive) was prepared.

This polymer emulsion contained an agglomerate in an amount of 25% based on the total weight of the emulsion. For the polymer emulsion, the solid content was 38.6%, the average diameter of particles in the discontinuous phase was 0.15 µm, and the storage stability was poor.

The tackiness properties of a pressure-sensitive adhesive prepared using the above polymer emulsion are summarized in Table 2.

As is apparent from Table 2, the pressure-sensitive adhesive prepared using the polymer emulsion of Comparative Example B-1 had holding power and adhesive strength inferior to the pressure-sensitive adhesives prepared using the polymer emulsions of Examples B-1 to B-7.

TABLE 2

|  | Ball tack | Adhesive strength (g/20 mm) | Holding power (mm) |
| --- | --- | --- | --- |
| Ex. B-1 | 6 | 820 | 0 |
| Ex. B-2 | 5 | 753 | 0 |
| Ex. B-3 | 6 | 785 | 0 |
| Ex. B-4 | 6 | 740 | 0 |
| Ex. B-5 | 6 | 750 | 0 |
| Ex. B-6 | 6 | 729 | 0 |
| Ex. B-7 | 6 | 662 | 0 |
| Comp.Ex. B-1 | 8 | 260 | Peeled and dropped 5 min after the initiation of the test |

What is claimed is:

1. A process of preparation of an aqueous emulsion for a pressure-sensitive adhesive, comprising:
   emulsifying a monomer mixture containing at least 50% by weight, based on the total weight of the monomer mixture, of a long-chain alkyl (meth)acrylate with the alkyl having 9 to 13 carbon atoms in an aqueous radical-polymerizable surfactant solution;
   dispersing the monomer mixture such that fine particles have an average diameter of not more than 2.0 µm; and
   polymerizing the monomer mixture in the presence of a polymerization initiator.

2. The process of preparation according to claim 1, wherein 0.1 to 5% by weight of the radical-polymerizable surfactant is used, based on the total weight of the monomer mixture.

3. The process of preparation according to claim 1, wherein the radical-polymerizable surfactant is an anionic or nonionic emulsifying and dispersing agent.

4. The process of preparation according to claim 1, wherein the radical-polymerizable surfactant is an anionic emulsifying and dispersing agent.

5. The process of preparation according to claim 1, further comprising an emulsifying and dispersing agent not having a polymerizable group, with not more than 50% by weight based on the total weight of the radical-polymerizable surfactant.

6. The process of preparation according to claim 1, wherein 5 to 80% by weight of the monomer mixture is used, based on the total weight of the polymerization system.

7. The process according to claim 1, wherein 0.01 to 5% by weight of the polymerization initiator is used, based on the total weight of the monomer mixture.

8. The process of preparation according to claim 1, wherein the polymerization initiator is water-soluble.

9. The process of preparation according to claim 1, wherein the average diameter of fine particles is 0.1 to 2.0 µm.

10. The process of preparation according to claim 1, wherein the average diameter of fine particles is 1.0 to 2.0 µm.

11. The process of preparation according to claim 1, wherein a pH buffer is further used.

12. The process of preparation according to claim 1, wherein a chain transfer agent is further used.

13. The process of preparation according to claim 1, wherein the monomer mixture comprises, based on the total weight of the monomer mixture, 75 to 99.45% by weight of the long-chain alkyl (meth)acrylate with the alkyl having 9 to 13 carbon atoms, 0.5 to 20% by weight of an aromatic vinyl monomer, and 0.05 to 5% by weight of a crosslinkable monomer.

14. The process of preparation according to claim 13, wherein the crosslinkable monomer is a monomer having two or more polymerizable double bonds per molecule.

15. The process of preparation according to claim 13, wherein 0.1 to 10% by weight of the surfactant is used, based on the total weight of the monomer mixture.

16. The process of preparation according to claim 13, wherein the average diameter of fine particles is 0.1 to 2.0 μm.

17. A process for the preparation of a pressure-sensitive adhesive product, comprising coating a support with an aqueous emulsion for a pressure-sensitive adhesive obtained by the process of preparation according to claim 1 and dehydrating or drying the emulsion.

18. The process of preparation of an aqueous emulsion for a pressure-sensitive adhesive according to claim 1, wherein 0.1 to 10% by weight of the radical-polymerizable surfactant is used, based on the total weight of the monomer mixture.

19. The process of preparation of an aqueous emulsion for a pressure-sensitive adhesive according to claim 1, wherein the monomer mixture comprises, based on the total weight of the monomer mixture, 75 to 99.45 by weight of the alkyl (meth)acrylate with the alkyl group having 9 to 13 carbon atoms.

20. The process of preparation of an aqueous emulsion for a pressure-sensitive adhesive according to claim 1, wherein said aqueous radical-polymerizable surfactant solution comprises a radical-polymerizable surfactant; and said redox polymerization initiator comprises a combination of an oxidizing agent and a reducing agent.

21. A pressure-sensitive adhesive prepared by dehydrating the aqueous emulsion obtained by the process of preparation according to claim 1, said pressure-sensitive adhesive has an adhesive strength of peeling against an adherent of 50 to 300 gf/20 mm, as measured by JIS Z 0237.

22. A pressure-sensitive adhesive product having a pressure-sensitive adhesive layer comprising the pressure-sensitive adhesive according to claim 21.

23. A pressure-sensitive adhesive prepared by dehydrating the aqueous emulsion obtained by the process of preparation according to claim 1, said pressure-sensitive adhesive has a holding power of adhesive strength against an adherent of not more than 20 mm in terms of the distance of displacement after holding for one hour, as measured by JIS Z 0237.

24. A pressure-sensitive adhesive product having a pressure-sensitive adhesive layer comprising the pressure-sensitive adhesive according to claim 23.

* * * * *